Oct. 26, 1965    W. O. BENJAMIN ETAL    3,213,751
PRISMATIC LIGHT TRANSMITTING PANEL
Filed May 13, 1959    2 Sheets-Sheet 1
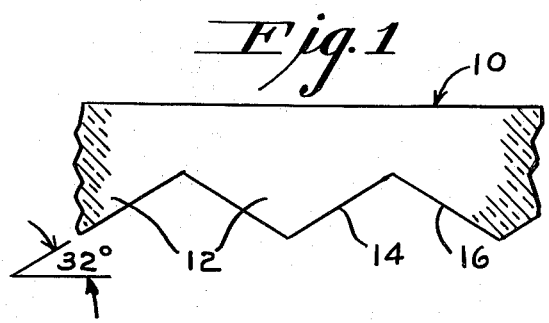
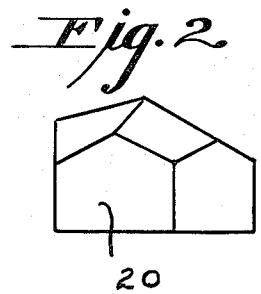
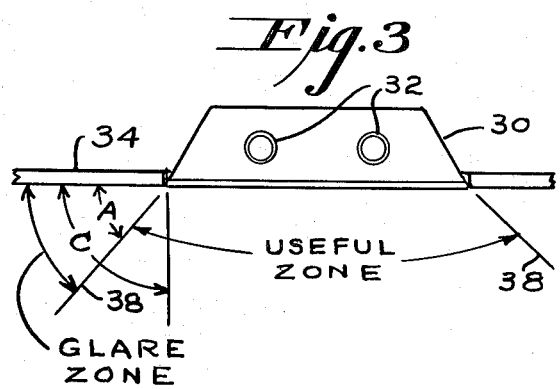
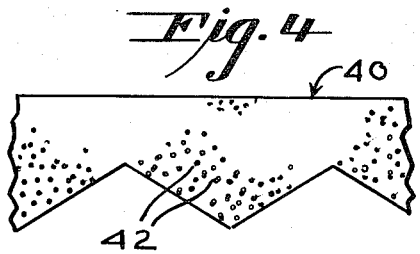
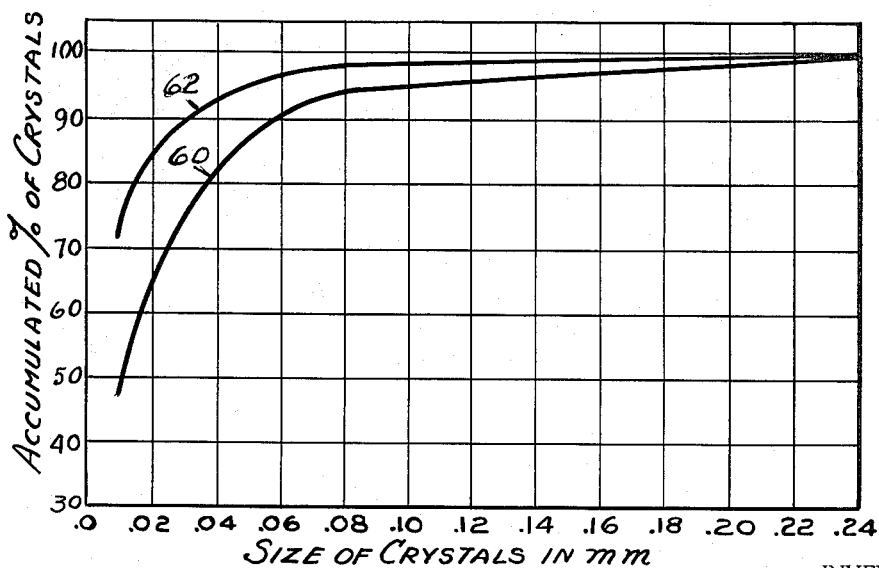
INVENTORS
WARREN O. BENJAMIN
AND ARTHUR R. JAEGER
BY
Clarence R. Petty, Jr.
ATTORNEY

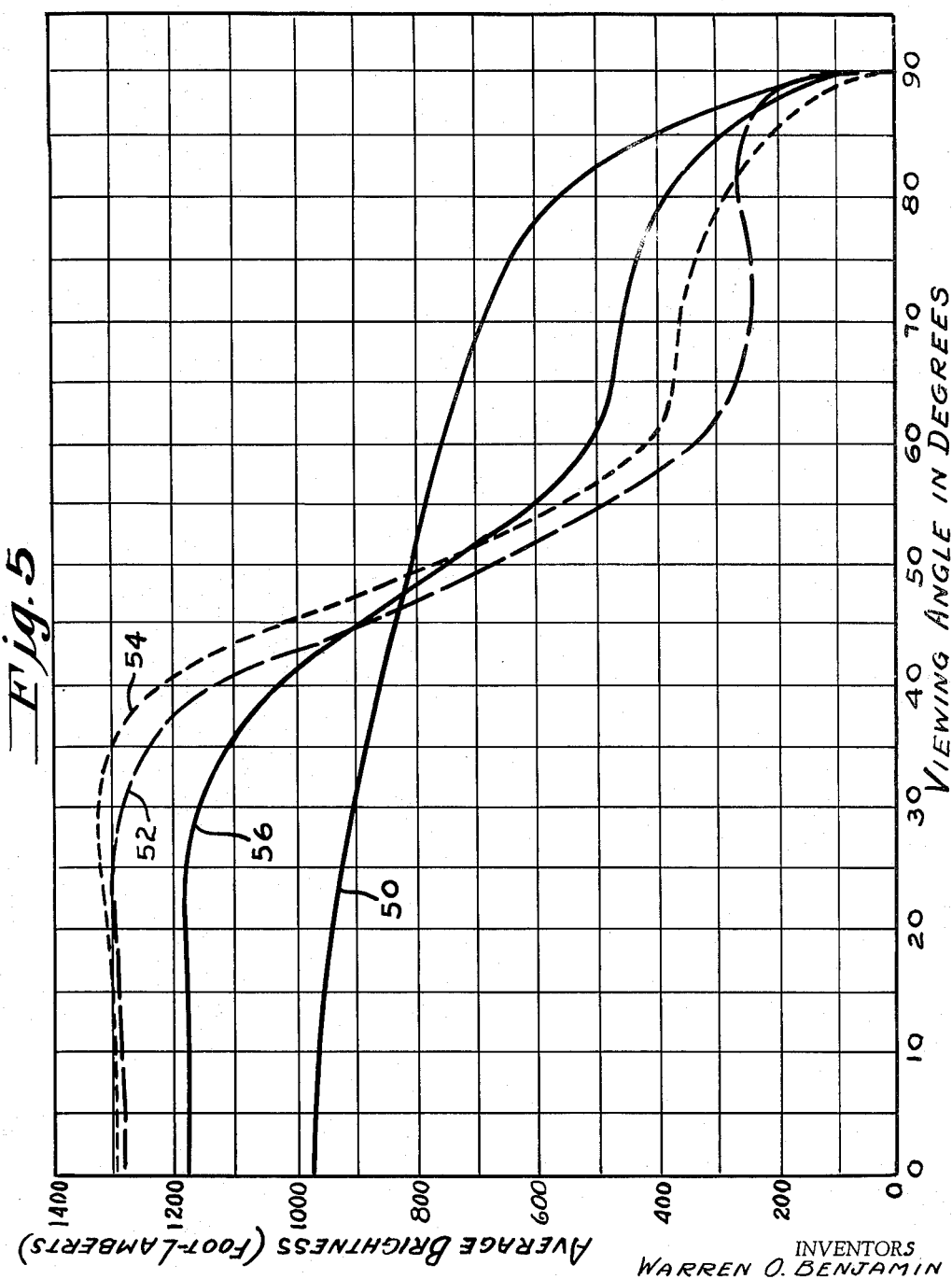

United States Patent Office 3,213,751
Patented Oct. 26, 1965

3,213,751
PRISMATIC LIGHT TRANSMITTING PANEL
Warren O. Benjamin and Arthur R. Jaeger, Corning, N.Y., assignors to Corning Glass Works, Corning, N.Y., a corporation of New York
Filed May 13, 1959, Ser. No. 812,840
2 Claims. (Cl. 88—57.5)

This invention relates to the illuminating art and is concerned with improvements in prismatic light transmitting panels of the type employed for directional lighting control by cut-off of high angle light. It is specifically concerned with a modified panel having light diffusing particles incorporated in the material of the panel.

Heretofore two distinctly different types of light transmitting media—light diffusing, and light directing or controlling media—have been employed in interior lighting fixtures. In the former, light from a lamp or other source is diffused to such an extent that the light transmitting panel or other medium appears as an enlarged light source. In the latter, refracting prisms on the surface of the light directing or controlling medium concentrate substantially all of the transmitted light into a desired zone or area.

Ordinary opal glass is a typical light diffusing medium. It contains many thousands of very small light diffusing particles per cubic millimeter of glass, such particles having a different index of refraction from that of the glass. Light rays entering such an opal glass medium are redirected within the glass each time they strike a diffusing particle. This results in scattering or diffusion of the light rays throughout the transmitting medium and gives the appearance of an enlarged light source. Light diffusing media, such as opal glass panels or globes, therefore, hide the initial light source and provide a softer, more pleasant type of light.

There are, however, certain disadvantages in this type of light transmitting media. A substantial amount of light is transmitted at high angles; that is, it is directed against walls or remote areas where it is not needed or is even undesirable. There is an increasing demand for brighter light in areas adjacent or beneath the fixture. This in turn creates a degree of surface brightness on the light diffusing medium sufficient to cause serious glare in more distant areas. The situation can be controlled to some extent by mechanical devices such as reflectors and the familiar egg crate type louver. However, it is highly desirable to avoid such special accessories if possible, particularly in public buildings and in office and school lighting.

A solution to this problem lies in the use of light-directing transmission media in the form of transparent prismed panels, the prisms generally being formed on the exterior or light-emitting surface of the panel. Such prisms either refract light rays as they leave the panel, or internally reflect the rays within the panel. With proper prism configurations and critical angle control, it is possible to concentrate transmitted light into a defined zone extending outwardly from the panel in a manner substantially to avoid any light entering areas outside such zone. In the lighting art it is customary to speak of the light being concentrated into a "useful zone" and being cut off at higher angles referred to as the "glare zone." Thus, high angle light which creates the glare problem at a distance from the light source is avoided. A detailed discussion of this type of lighting control and the manner in which it is effected with prismatic panels may be found in United States Patent No. 2,474,317 to R. G. McPhail. An alternative and particularly desirable prism design is shown in co-pending U.S. application S.N. 751,922, now Patent No. 3,068,754, assigned to the assignee of this application.

However, such prismatic light control has not been entirely satisfactory. Due to surface tension effects at glass molding temperatures, it is extremely difficult to produce perfectly formed prisms on the surface of a glass panel, particularly when such prismed panel is formed in a rolling process. A more significant factor, however, is appearance. Above the cut-off angle, a transparent, prismed lighting panel has a dark or gray appearance which changes sharply to a bright appearance as one enters the area of concentrated light. This sharp transition between light and dark appearance is also observable over the panel, with certain facets of the prisms appearing dark and others bright. These readily perceptible changes in appearance produce an adverse visual effect that is highly undesirable in home and office use, as well as in commercial and industrial areas where the importance of pleasing surroundings is achieving increased recognition. In fact, it has resulted in such lighting panels being termed "commercial," "metallic," "mechanical," and "cold" lighting ware by decorators, architects, designers, and the like.

A primary purpose of this invention is to provide a prismatic lighting panel in which prior deficiencies are corrected. A further purpose is to provide a degree of light diffusion in a prismatic lighting panel without unduly altering the primary function of the prisms in effecting directional light control. A specific purpose is to provide a sufficient degree of light scattering in a prismatic panel whereby a more pleasing visual sensation is produced during use of the panel. A further specific purpose is to so modify prior transparent prismatic lighting panels as to convert the characteristic light cut-off angle to a transition zone of diminishing light brightness.

The invention resides in a lighting panel having light refracting prisms formed on at least one surface of the panel and having a small number of light diffusing particles uniformly dispersed within the panel.

The invention is further described in conjunction with the accompanying drawing in which, FIG. 1 is a fragmentary sectional view of a prior prismatic panel.

FIG. 2 is a side elevation view of a single pyramidal unit in another form of prior prismatic panel, FIG. 3 is a schematic sectional view of a lighting fixture illustrating the directional light control achieved with prismatic panels, FIG. 4 is a fragmentary elevational view in section of a panel in accordance with the present invention, FIG. 5 is a graphic illustration of the light distribution in different types of lighting panels, FIG. 6 is a graphic illustration of a preferred embodiment of the invention.

FIG. 1 illustrates a molded glass lighting panel 10 having symmetrical prisms 12 molded in aligned arrangement on the under or light-emitting surface of the panel and forming a 32° angle with a horizontal phase. The manner in which light is refracted to produce cut-off of high angle light emission, determination of the proper prism angle, and general principles of directional lighting control are discussed in detail in the previously mentioned McPhail patent. Reference is made to the patent for further information of this type inasmuch as the present invention is not concerned with particular prism configuration.

FIG. 2 shows a single pyramidal prism unit 20 that forms a 28° angle with the horizontal and is characterized by its lack of symmetry. Such units may be compactly arranged in an irregular order to form a prismatic lighting panel having no elongated linear pattern or linear valleys parallel to the smooth, back surface of the panel. Prismatic panels of this type, and the manner in which the pyramid units are arranged in such panel, are fully described in the above-mentioned co-pending application S.N. 751,922, and reference is made thereto for details.

The general nature of directional light control, as achieved with transparent prismatic panels of FIGS. 1 and 2 may be seen from the schematic illustration of FIG. 3. In this illustration a recessed lighting fixture 30 embodying two fluorescent lighting tubes 32 is recessed within a room ceiling 34. A prismatic panel 36, which may have the prism configuration of either FIGS. 1 or 2 on its lower surface, is arranged in the fixture opening flush with ceiling 34. The well known directional lighting control achieved with a prismatic panel concentrates transmitted light into a zone, here referred to by its common designation "useful zone," and defined by the zone within lines 38. The angle that lines 38 make with respect to a line normal to the panel will vary with different types of prismatic lighting panels, but may for example be about 50–55° when a unit of the type illustrated in FIG. 2 is employed. The angle identified as A and defined by line 38 and the horizontal line of the ceiling 34 is commonly referred to as the cut-off angle; that is, the angle within which light transmission is effectively cut off or avoided. The zones subtended by such cut-off angles are identified by their usual designation, the "glare zones." These are the zones in which undesirable glare occurs with plane transparent or opal glass panels and in which such glare may be avoided by the use of prismatic panels.

The McPhail patent teaches that light will still be emitted within this cut-off or glare zone unless critical prism angles between 30–35°, depending on refractive index, are chosen. It has also been found in practice that it is extremely difficult to produce sharply defined prisms, there being a tendency for the mold to chill the glass surface before the sharp angles in the mold are completely filled. This results in the normal point or peak of the prism being a rounded surface rather than a sharp angle. Failure to accurately produce the required prism angle results in varying degrees of stray light being transmitted at high angles due to loss of light control at the prism face junctions.

An important feature of the present invention resides in relaxing the necessity for such critical prism angle control in avoiding glare in the glare zones. A further important feature is modification of the light transmission in any type of prismatic panel whereby the sharp cut-off line identified by numeral 38 in FIG. 3 is replaced by a zone, which may be several degrees in extent, wherein the brightness of light gradually diminishes, thus providing a soft pleasing transition zone of light rather than a sharp contrast between light and dark. FIG. 4 illustrates a prismatic lighting panel 40 constructed in accordance with the present invention and embodying, for purposes of simplified illustration, a symmetrical regular prism pattern corresponding to that of FIG. 1. Dots 42 schematically illustrate light-diffusing particles dispersed in the mass of panel 40. In glass, such particles may take the form of opacifying crystallites precipitated within the glass while it is being cooled from the molten state.

Our invention is based on the discovery that the purposes of the present invention can be substantially accomplished providing such light diffusing particles are employed in a sufficiently small number within the lighting panel. For example, in a glass lighting panel of the modified type, the opal or light diffusing crystallites will be of sufficiently small number and size that they are barely, if at all, perceptible to the eye as one looks perpendicularly through the panel. Thus, panel 40 along a vertical plane would appear as essentially clear transparent glass in a panel of about ⅛" thickness. However, the presence of the crystallites become readily perceptible as one views the glass along a horizontal plane of a few inches in length.

The effectiveness of a small number of opal crystallites in a glass panel for present purposes is due to a number of interrelated factors. As indicated earlier, when one looks across a completely transparent panel such as panel 10 of FIG. 1, certain of the prism faces appear relatively dark as compared to other prism faces. Thus prism faces 14 might appear relatively dark as compared to prism faces 16. This is essentially due to the directional light control achieved by refraction of the light rays emerging from the prismed surface. With only a relatively small number of light diffusing particles present, there is nevertheless some diffusion of light rays passing directly through the panel. The result of such diffusion is to throw more light into the dark areas and to render the transition lines at the prism peaks and valleys less perceptible to the eye. This results in a softer, more pleasing appearance in the panel.

It will be appreciated, however, that the light diffusion effect on light entering the useful zone will be relatively small and that the total amount of light transmitted into this zone will remain substantially unchanged. In other words, the desired function of directional light control achieved with a prismed surface remains substantially unchanged insofar as effective concentration of light is concerned. In contrast, an ordinary light diffusing opal glass produces such a high degree of light diffusion that subsequent refraction occurring at prism surfaces is ineffective for directional control. Thus, the appearance of a conventional opal glass panel having a prismed or ribbed surface is not readily visually discernible from that of a corresponding opal glass panel having a plain or flat light emitting surface.

The effect achieved at the cut-off line with opal crystallites in accordance with our invention may be explained in this manner. Light traveling through a panel into the so-called "useful zone" travels along a relatively short path. Light rays which would normally pass out into the glare zone must travel along a more nearly horizontal path and hence a path that is much longer. Further, since light entering the glare zone is composed of light multiply reflected within the panel, it is readily apparent that such light must travel an extremely long total path before leaving the panel. In traveling such longer path, it will readily be seen that high angle light rays must necessarily encounter a correspondingly much larger number of light diffusing particles. Accordingly, the small number of crystallites 42 dispersed in panel 40 exert a relatively large light diffusing effect on light rays passing into the glare zone. Consequently any light entering this zone is much more diffuse and softer in appearance than would be the case with light entering the useful zone beneath the panel.

In a manner similar to that described above with respect to the prism faces, a diffuse zone of light is produced in the area of the so-called glare zone immediately adjacent the cut-off angle. As a result of producing this zone of diffused light by means of crystallites 42, the cut-off line, such as indicated by numeral 38 in FIG. 3, is replaced by a zone of diffuse light of diminishing brightness.

The effects described above may be illustrated in various ways. The graph of FIG. 5 provides one such illustration. The angle of deviation or rise from a vertical plane passing through a panel, shown as angle C in FIG. 3, is plotted on the horizontal coordinate. The vertical coordinate of FIG. 5 indicates average brightness of light, in foot-lamberts, transmitted as one passes along angle C starting from the nadir at 0 degrees and rising to the horizontal or zenith line at 90°.

The data on which the curves of this graph are based was obtained by measuring brightness with a standard photocell aimed at various angles across the perpendicular or long axis of panels in a lighting fixture. The fixture was a conventional fluorescent light type having two 40-watt lamps and a standard rating of 2560 lumens per lamp.

Curve 50 shows the brightness as measured at various angles across a commercial opal glass panel having 32° ribs molded on the panel surface. It may be noted that a plain surface opal panel would provide essentially the same curve. Curve 52 shows the corresponding brightness measurements with a transparent prismatic panel, corresponding to that of FIG. 1, substituted in the lighting fixture for the opal panel. Curve 54 represents brightness measurements on a panel corresponding to that of FIG. 2. Curve 56 shows data from a prismatic panel according to FIG. 2, but modified by introducing light diffusing particles in accordance with the present invention.

It will be observed that curve 50 for the opal glass panel is a flat curve throughout approaching the condition obtained with no light transmitting panel in the fixture and having high brightness in the zone beyond 55°. Each of the other curves has a relatively flat, level portion from 0° to about 40° and a much lower level portion from about 60° to 85° beyond which the curves drop off. Between about 40° and 60° there is a steep slope in each curve and this typifies prismatic light transmitting panels and the directional control achieved with such panels. It may be noted that the slope for curves 52 and 54, corresponding to transparent panels and at about 50–55°, their approximate cut-off angle or line, is about 37 foot lamberts per degree. The slope of the opal panel curve 50 is 5 and that of the panel of this invention is about 24. While these values may vary by 10% or so depending on the particular panels employed, one means of distinguishing panels acceptable for present purposes is a slope of about 24 in the average brightness curve at 50–55°.

We have found that the optimum and permissible light diffusion for purposes of this invention is dependent both on the total number of light diffusing particles per unit volume of transmitting medium and the size distribution of such particles. It is necessary, as a practical matter then, to exert reasonably careful control over both of these factors in producing light panels for present purposes. While any of the various glass opacifying media might be employed in suitable base glasses for present purposes, we have found that it is extremely difficult to control development of a suitable number of light diffusing particles in any but a sulphate opal glass; that is, a glass containing precipitated particles of a sulphate salt as the opacifying or light diffusing media.

In such a glass, we have found that the number of light diffusing particles per cubic millimeter of glass should preferably be within a range of 150–1000. With smaller numbers the light diffusing effect is so small as to not adequately soften the transition from light to dark areas. More than about one thousand particles per c. mm. provide too much light diffusion to permit effective directional light control with prisms. In addition to these numerical limitations, reference is made to the graphic illustration of FIG. 6 which shows effective particle size distributions at these maximum and minimum numbers of crystallites. The horizontal coordinate of FIG. 6 shows crystallite particle size in millimeters. The vertical ordinate represents "accumulated percent of crystals," that is, the percentage of the total number of particles present that do not exceed given sizes as indicated on the horizontal ordinate. For example, a point on the graph defined by intersection of the 90 percent line from the vertical ordinate and the 0.04 mm. line from the horizontal ordinate would indicate that 90% of the total number of particles present in the sample are not over 0.04 mm. in size, whereas the remaining 10% of the particles are greater than that size. In this graph curve 60 shows the desired particle distribution in a sample having about 150 crystallites per cubic millimeter, that is in a pale limit sample. Correspondingly curve 62 represents the desired particle size distribution in a dense limit sample, that is one containing on the order of one thousand particles per c. mm.

The curves shown in FIG. 6 are based on microscopic counts made on commercial panel limit samples. It will be noted that the light diffusing particles should all be below about 0.25 mm. Also the average particle size is smaller in the dense than in the pale limit sample. The dense limit has about 28% of the particles between 0.01 and 0.25 mm., whereas the pale has about 53% within these limits.

It will be understood that the limits specified above with respect to particle size and distribution and number may vary somewhat depending on the particular type of particle employed and the degree of light diffusion considered necessary and acceptable. These ranges simply illustrate limits which have been found to define a commercially acceptable panel for present purposes produced from a sulphate type opal glass.

By way of further illustrating practice of my invention, it has been found that acceptable prismatic panels for present purposes were produced by rolling a glass containing as base constituents about 60% $SiO_2$, 10% $Al_2O_3$, 10% $BaO$ and 15% $Na_2O$, the remainder of the glass being composed of compatible glass-making constituents including about 2–3% sulphate, calculated as $SO_3$ for particle formation, about 0.5–1.5% arsenic oxide for promotion of crystallite formation as well as fining, and 0.5–1.0% $TiO_2$ for imparting resistance to solarization of the glass in use.

It will be appreciated that the advantages of the present invention may be achieved, in some degree at least, by means other than the preferred embodiment specifically described above. Thus insoluble opacifying particles, such as talc, of a proper size and amount might be incorporated in a glass or plastic mass by stirring or by other means to provide a material from which the prismatic panels in accordance with the invention might be produced. To avoid undue loss of light, one might expect to use smaller particle sizes in the event that the particles are light absorbing. Accordingly, variations and modifications of the invention may be made within the scope and spirit of the appended claims.

What is claimed is:

1. In a luminaire comprising a light source mounted within a fixture having an opening through which light is normally directed into an area to be illuminated, an improved light transmitting panel covering the opening, said panel having
    (1) light refracting prisms formed on at least one surface of the panel, and
    (2) a small number of light diffusing particles dispersed throughout the panel,
        (a) said particles being in a concentration of 150–1,000 crystallites per cubic mm. of material
        (b) said particles having a size not in excess of 0.25 mm., and
        (c) the distribution of those particles which are between 0.01 and 0.25 mm. in size falling within a zone defined by curves 60 and 62 in FIG. 6, whereby substantially all of the light transmitted through the panel is effectively concentrated by the refracting prisms into a predetermined zone bounded by a narrow peripheral band of gradient brightness, while reflected, stray, high angle light is rendered relatively diffuse in proportion to its longer path of travel within the panel.

2. A luminaire in accordance with claim 1 wherein the light transmitting panel is composed of a silicate glass containing precipitated sulfate particles as the light diffusing particles.

References Cited by the Examiner

UNITED STATES PATENTS

| | | | |
|---|---|---|---|
| 1,192,048 | 7/16 | Elliott | 106—52 |
| 1,563,584 | 12/25 | O'Shaughnessy. | |
| 1,748,587 | 2/30 | Smedley. | |
| 2,380,241 | 7/45 | Jelley et al. | 88—28.93 |
| 2,398,507 | 4/46 | Rolph | 88—60 |
| 2,443,918 | 6/48 | Lahousse et al. | 88—28.93 |
| 2,474,317 | 6/49 | McPhail. | |
| 2,480,031 | 8/49 | Kellogg | 88—57.5 |
| 2,921,860 | 1/60 | Stookey | 106—52 |

JULIA E. COINER, *Primary Examiner.*

EMIL G. ANDERSON, WILLIAM MISIEK, NORTON ANSHER, *Examiners.*